United States Patent [19]

Okada

[11] Patent Number: 5,168,795
[45] Date of Patent: Dec. 8, 1992

[54] AUTOMATIC FOOD FRYING AND VENDING SYSTEM

[75] Inventor: Katsumi Okada, Tokyo, Japan

[73] Assignee: Higashi Hiroshima Golf Shinko Kabushiki Kaisha, Hiroshima, Japan

[21] Appl. No.: 795,372

[22] Filed: Nov. 21, 1991

[30] Foreign Application Priority Data

Nov. 29, 1990 [JP] Japan .................................. 2-333168
Nov. 30, 1990 [JP] Japan ............................ 2-129005[U]

[51] Int. Cl.$^5$ .............................................. A47J 37/12
[52] U.S. Cl. ........................................ 99/326; 99/336; 99/357; 99/407; 99/409; 221/150 HC; 221/150 A
[58] Field of Search ...................... 99/289 R, 326, 357, 99/325, 403, 407, 409, 411, 355, 334, 336; 221/150 R, 150 A, 150 HC

[56] References Cited

U.S. PATENT DOCUMENTS

| | | | |
|---|---|---|---|
| 2,990,973 | 7/1961 | Chazen | 99/357 |
| 3,237,804 | 3/1966 | Bardy et al. | 99/357 |
| 3,425,339 | 2/1969 | Fleischman et al. | 99/357 |
| 3,442,200 | 5/1969 | Babel | 99/357 |
| 3,685,432 | 8/1972 | Hoebrigs | 221/150 HC |
| 3,928,045 | 12/1975 | Tsunoda et al. | 99/443 R |
| 4,030,632 | 6/1977 | Harashima | 221/150 A |
| 4,505,193 | 3/1985 | Mariotti | 99/334 |
| 4,771,913 | 9/1988 | Johndrow et al. | 221/150 A |
| 4,821,633 | 4/1989 | Ripatonda | 99/407 |
| 4,945,826 | 8/1990 | Ripatonda | 99/403 |

FOREIGN PATENT DOCUMENTS 2491031 4/1982 France .................................. 99/407

Primary Examiner—Timothy E. Simone
Attorney, Agent, or Firm—Finnegan, Henderson, Farabow, Garrett and Dunner

[57] ABSTRACT

An automatic food frying and vending system having a refrigerated storage chamber for storing food material to be fried and a frying chamber for frying material in cooking oil are installed in the main body of the automatic food frying and vending system in discrete sections designated for their respective purposes. The refrigrated chamber includes a stocker unit for receiving and keeping a number of packed containers, each sealed by a lid. A feeding device is provided with a holder for receiving from a conveying device the sealed container and inverting the container. The holder and a cutter is disposed on a movable table which moves in a substantially horizontal direction, so that, when the container is transferred to the holder, the holder is positioned in the vicinity of the storage chamber, and, when the sealed lid of the container is opened, the cutter is positioned over a frying basket in the frying chamber to enable the food material to be dropped by their own weight into the frying basket simultaneously with the opening of the sealed lid. A guide member covers the top of a cup supported on a placement table. After filling with the cooked food, the table moves downwardly for removal of the filled cup from a takeout port.

10 Claims, 11 Drawing Sheets

AUTOMATIC FOOD FRYING AND VENDING SYSTEM

FIELD OF THE INVENTION

Background of the Invention

This invention relates to an automatic food frying and vending system which is capable of automatically cooking food, such as fried chicken, chicken nuggets, fried potatoes, and others, and vending the same by coin-operation.

Discussion of Related Art

An automatic vending system, in which food material is automatically fried with cooking oil and sold, is known, as disclosed, for example, in laid-open Japanese patent application No. 20520/1985.

This conventional food frying and vending system is of a type wherein a container of food material for frying is stored in a refrigerator installed separately from the frying and vending machine and is taken out of the refrigerator by a consumer. Then its lid is opened by a cutter; and the food material in the container is introduced into the frying machine. As a consequence, the food processing operation is troublesome, and, oftentimes, the container of food material is fed into the frying machine without opening its sealed lid, which has been the cause for various machine troubles.

With a view to avoiding such an operation of the machine, the present inventor proposed in his previous Japanese patent application No. 17490/1989, an improved automatic food frying and vending system, which comprises in combination: a refrigerated storage chamber to store food material for frying; and a frying chamber to fry the food material, both chambers being installed in a main body of the system with a discrete heat-insulating partition being provided between them, the storage chamber being provided therein with a plurality of stocking units, each receiving and holding a multitude of containers with lids, in which the food material for frying is placed; conveying means which forwards from the storage chamber the containers of food material for frying held in the stocker unit; and feeding means which receives and holds thereon, the containers as forwarded by the conveying means, opens the seal of the lid of the container, and introduces the food material packed in the container into the frying chamber, for frying thereby making it possible to carry out a series of operations from the refrigerated storage of the food material for frying to its cooking and vending, in a streamlined fashion.

SUMMARY OF INVENTION

The present invention is concerned with further improvement in the above-described automatic food frying and vending machine, which is capable of effecting more securely the process steps starting from the refrigerated storage of the food material for frying to their cooking and vending, or, more particularly, the process step of into the frying chamber the food materials stored in a refrigerator, both of which are installed in one and the same main body of the system.

In order to attain the abovementioned object, the automatic food frying and vending system according to the present invention. comprises in combination: a refrigerated storage chamber to store the food material for frying; a frying chamber for frying the food material, both chambers being installed in a main body of the system with a discrete heat-insulating partition being provided between them, the storage chamber being provided therein with a plurality of stocker, unit each receiving and holding a plurality of containers with a lid, in each of which is packed the food material for frying; conveying means for forwarding the containers of food material for frying held in the stocker units, and feeding means which receives and holds the containers forwarded by the conveying means, opens the sealed lid of the container, and introduces into the frying chamber the material packed in the container. The feeding means is provided with a holder for receiving by transfer, and holding the container for the frying material as forward from the storage chamber by the conveying means, and inverting the container; and a cutter for opening the sealed lid of the container of material for frying held by the holder when it is inverted, both holder and cutter being disposed on a movable table which moves in a substantially horizontal direction, whereby, when the container of the food material for frying as conveyed from the storage chamber is transferred and held on the holder, the holder is positioned in the vicinity of the storage chamber; and, when the sealed lid of the contained is opened, the cutter is positioned over a frying basket for frying installed in the frying chamber to enable the food material for frying in the container to be dropped by its own weight into the frying basket simultaneously with the cutting open of the sealed lid.

As described above, according to the present invention, the feeding means for introducing the container of food material for frying as conveyed from the storage chamber by the conveying means into the frying chamber, is constructed by disposing, on a table movable in a substantially horizontal direction, the holder which receives the container, as transferrd from the storage chamber, and inverts it, and the cutter which cuts open the lid of the container of food material for frying is held by the holder at the time of its inversion, wherein the container of food material for frying, as conveyed from the storage chamber, is transferred to, and held on the abovementioned holder, the holder being positioned in the neighborhood of the storage chamber; and, when the lid of the container is to be cut-open, the cutter is positioned above the frying basket for the frying work so as to enable the food material in the container to be dropped into the basket by its own weight as soon as the container is cut-open. With such construction, the food materials to be fried, as conveyed from the storage chamber, can be easily fed, without failure, into the basket for accomplishing the frying of the frying chamber.

In the following, the construction and operating functions of the automatic food frying and vending system according to the present invention will be described in detail with reference to a preferred embodiment thereof shown in the accompanying drawing.

DESCRIPTION OF PREFERRED EMBODIMENT

Figure 1:
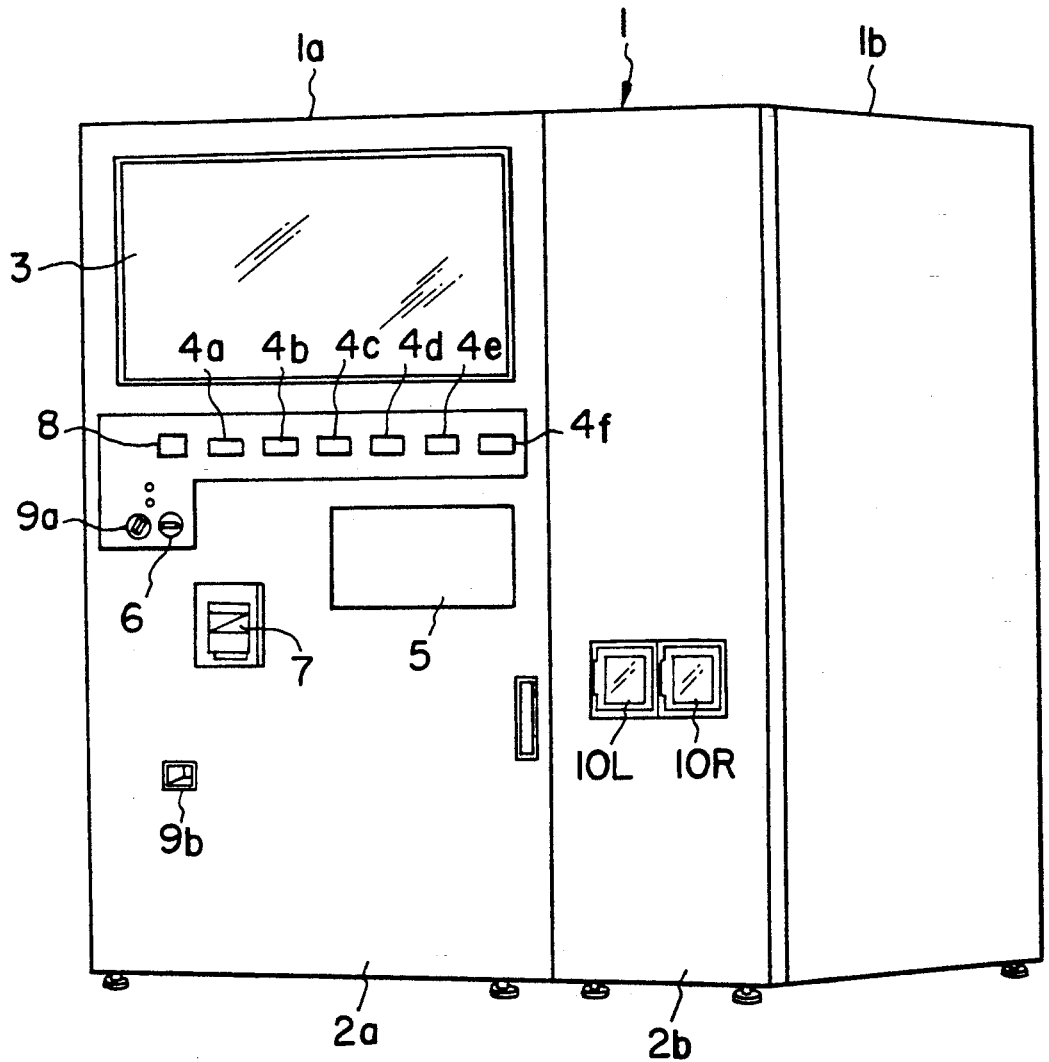
FIG. 1 is a front perspective view showing an external appearance of the automatic food frying and vending system according to one embodiment of the present invention.
Figure 2:
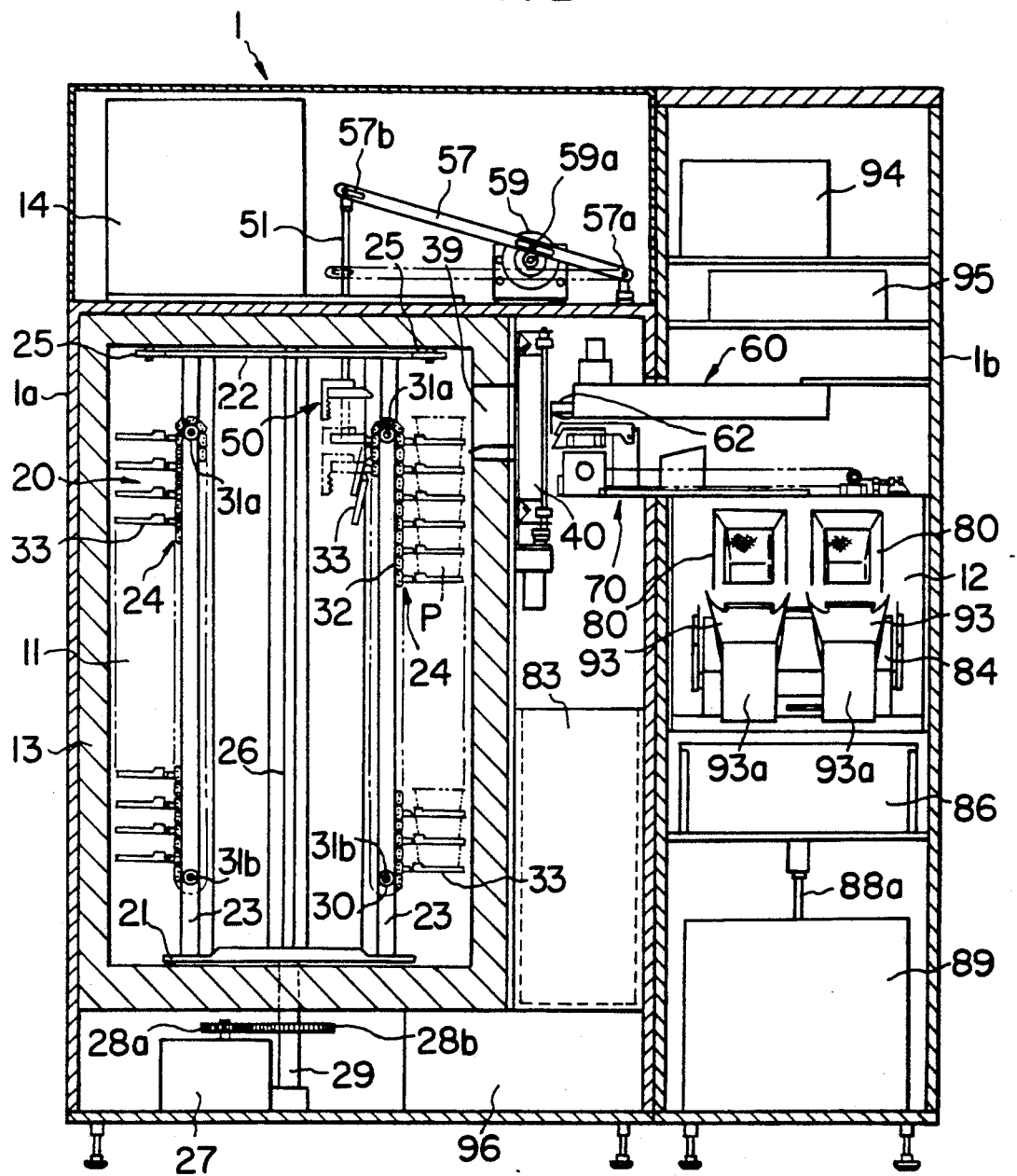
FIG. 2 is a front view, partly in longitudinal cross-section, of the automatic food frying and vending system shown in FIG. 1.

Referring now to FIGS. 1 and 2 of the accompanying drawing, respectively, illustrating the external appearance, in a perspective view, of the automatic food frying and vending system according to one embodiment of the present invention, and an enlarged front view, partly in longitudinal cross-section, of the system, a reference numeral 1 designates the main body of the system, which, in the illustrated embodiment, is of such a construction that, as shown in FIG. 2, two main body casings 1a, 1b are juxtaposed integrally.

The front faces of the main body casings 1a and 1b are respectively provided with opening and closing doors 2a and 2b. On the front face of the door 2a of the main body 1a, there are provided a display panel 3, selection buttons 4a to 4f for food to be fried, a display panel 5 for indicating the progress of the frying operation, a coin-inserting slot 6, a bank note inserting slot 7, a monetary amount indicating window 8, a coin-returning lever 9a, and a returned coin receiving port 9b. Also, on the front face of the other door 2b of the main body 1b, there are provided a pair of juxtaposed take-out ports 10L and 10R for fried food, each being closable by a small door.

In the interior of the abovementioned main body casing 1a, there is installed a refrigerated storage chamber 11 for storing the food material for frying while, within the main body casing 1b, there is installed a frying chamber 12 for frying the food material in cooking oil.

The inner surface of the storage chamber 11 is lined with a heat insulating matertial 13. In the top compartment of this storage chamber 11, there is installed a refrigerator 14 to constantly maintain the interior of the storage chamber 11 at a predetermined temperature (e.g., about −20° C.).

Further, within the storage chamber 11, there is installed a stocker units 20, on which a multitude of individual plastic containers P, each being covered with a lid and containing therein food material for frying, are stacked.

Figure 4:
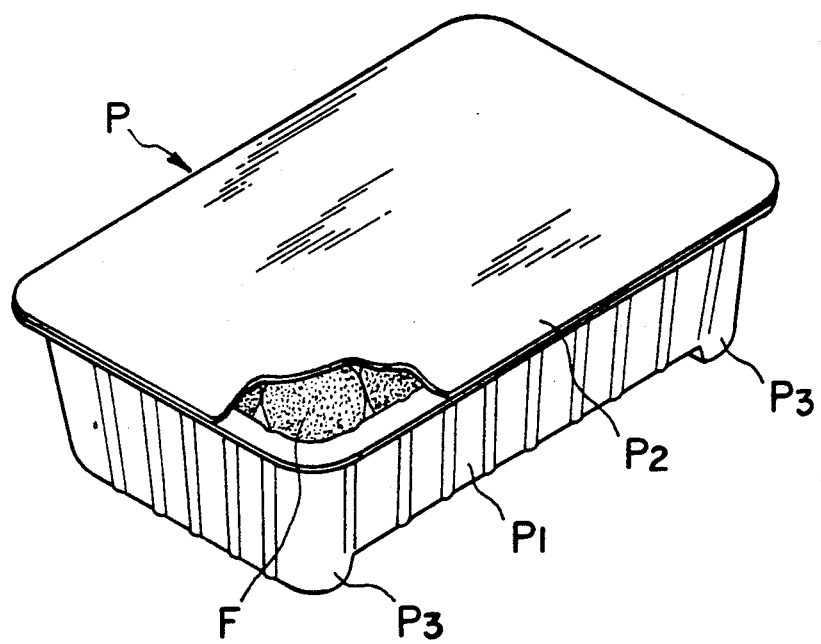
FIG. 4 is a perspective view, partly cut-away, showing a container for holding food material for frying.

In one embodiment, as shown in FIG. 4, this food material container P is of such a construction that it is made up of a container main body P1 and a lid P2. The container main body itself takes a substantially rectangular shape, as viewed in plan, having a peripheral flange around its opening, into which the food material F for frying F is packed, and the lid made of a plastic sheet is placed on this open periphery of the main body for tight sealing.

Figure 6:
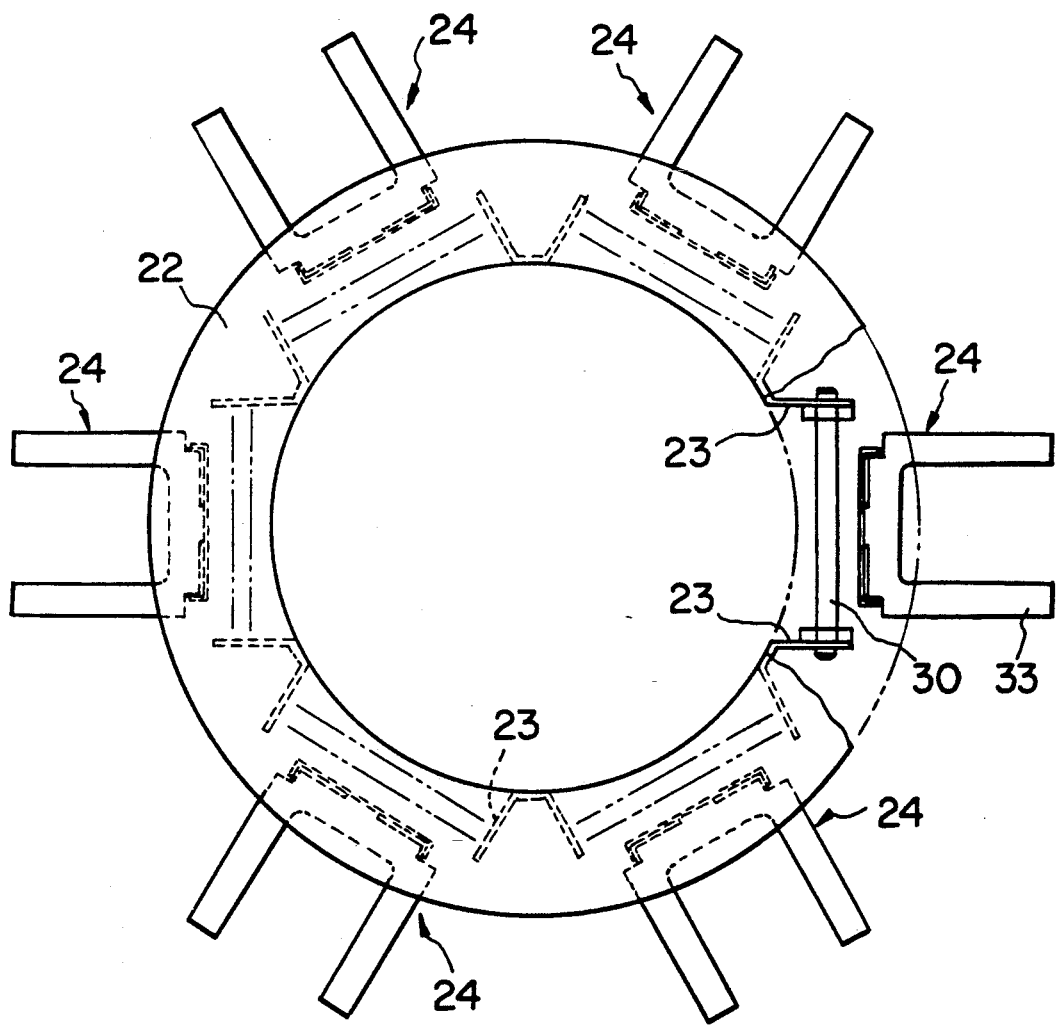
FIG. 6 is a plan view of a stocker unit.

As shown in the illustrated embodiment of FIGS. 2 and 6, the stocker units 20 is constructed with a turn table 21 provided at the bottom of the storage chamber, an annular disc 22 provided at the top of the storage chamber, a plurality of stanchions 23, each being in a substantially V-shape in cross-section, which are extended and disposed circumferentially between the turn table 21 and the annular disc 22, and a plurality of endless chain conveyors 24 moving in the up and down direction, which are extended vertically between the adjacent stanchions. In the embodiment shown in FIG. 6, six chain conveyors 24 are arranged in the circumferential direction. In FIG. 2, a reference numeral 25 designates rollers for rotatably holding the abovementioned annular disc 22.

The stocker units 20, as shown in FIG. 2, is rotatable around a vertical shaft 26 erected at the substantial center part of the storage chamber 11, which is rotationally driven at a low speed by an electric motor 27 installed underneath the storage chamber 11 through a media of meshed gears 28a, 28b and a cylindrical shaft 29 integral with the turn table 21.

Each of the abovementioned chain conveyors 24 is of such a construction that, as shown in FIG. 2, an endless chain 32 of a synthetic plastic material is extended between a pair of upper and lower sprockets 31a, 31b provided in a freely rotatable manner through transverse shafts 30 held between the adjacent stanchions 23, 23, and a multitude of racks 33 are attached on each chain for mounting thereon the container P of food material for frying.

Figure 5:
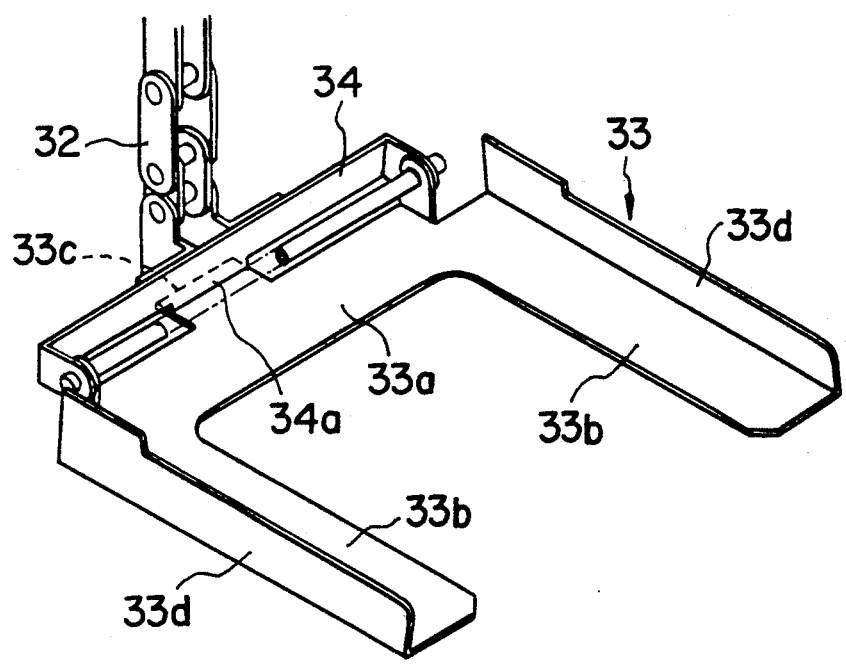
FIG. 5 is a perspective view showing a rack for holding the food container thereon.

As shown in FIG. 5, each of the racks 33 is formed in a substantially angled "U" shape, the horizontal base side 33a of which is attached onto the chain 32 in a manner capable of rising and falling on a transverse pivotal shaft 35 through a bracket 34. When the rack 33 comes to a position outside the chain 32, a protruded part 33c formed on the horizontal base side 33a of the rack 33 in the angled "U" shape comes into contact with the lower surface of a protruded part 34a formed on the bracket 34 to be held substantially horizontally as illustrated. On the contrary, when the rack comes to a position inside the chain 32, it hangs downward.

Since the container P of the food material for frying is mounted on the upper surface of the mutually opposite vertical fork portions 33b, 33b of the rack 33 in the angled "U" shape held substantially horizontally as mentioned above, the bottom of the container has a pair of left and right protrusions P3 formed, as shown in FIG. 4, to prevent it from shifting sidewise when the container is mounted on the rack, and, as shown in FIG. 5, each of the abovementioned vertical fork portions 33b, 33b of the rack 33 has an upwardly perpendicular bent portion 33d which comes into contact with the inner surface of the abovementioned protrusion P3.

In addition, each of the abovementioned chain conveyors 24 is provided with a reverse-rotation preventive mechanism (such as a rachet mechanism) to prevent the rack 31, on which the container P is mounted, from dropping by its own weight. In the preferred embodiment of the present invention, a one-way clutch is incorporated between the upper sprocket 31a of the chain conveyor and the abovementioned transverse shaft 30 holding the same in a freely rotatable manner, which is, however, omitted from the illustration.

Further, in the preferred embodiment of the present invention, six chain conveyors 24 are installed in the stocker so as to accommodate, in each of them, the containers food materials for frying of different kinds, such as those for fried chicken, chicken nuggets, fried potatoes, and so forth. The chain conveyor is so constructed that, when a purchaser selects a desired food for frying, the stocker 20 is automatically rotated by the abovementioned electric motor 27, whereby the chain conveyor 24 accommodating the food material for frying as selected by the purchaser, is automatically moved to, and stopped at, the position facing the frying chamber 12, by means of a detector, a stopper mechanism, and others (not shown in the drawing).

In the vicinity of the topmost rack 33 on the chain conveyor 24 positioned to the side of the frying chamber 12, there is provided a transfer port 39, through which the container P of the food material for frying mounted on this topmost rack 33 is to be conveyed into the frying chamber, and a pair of left and right doors 40, 40 which function to open and close the transfer port 39.

Figure 9:
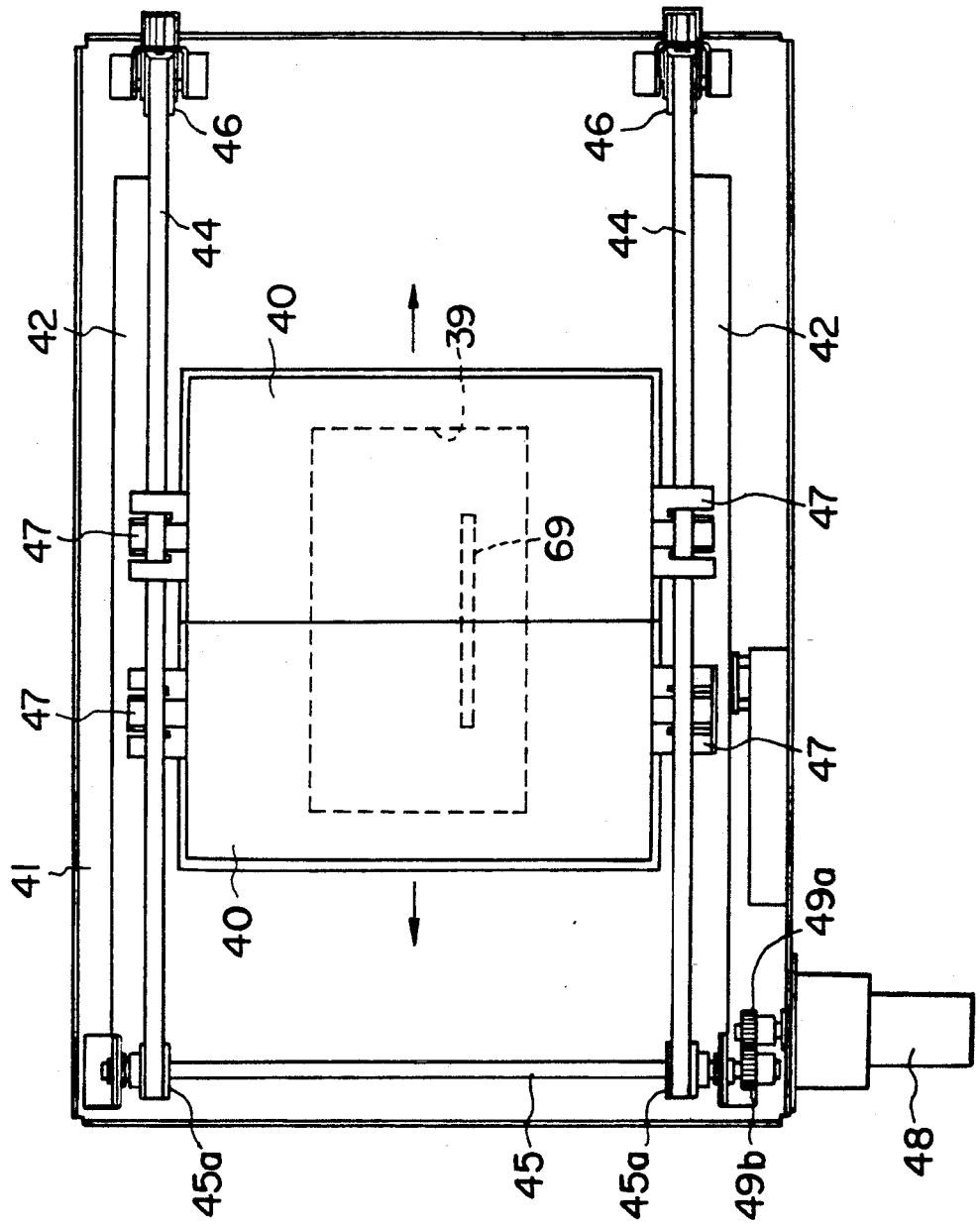
FIG. 9 is a front view of an opening and closing door.
Figure 10:
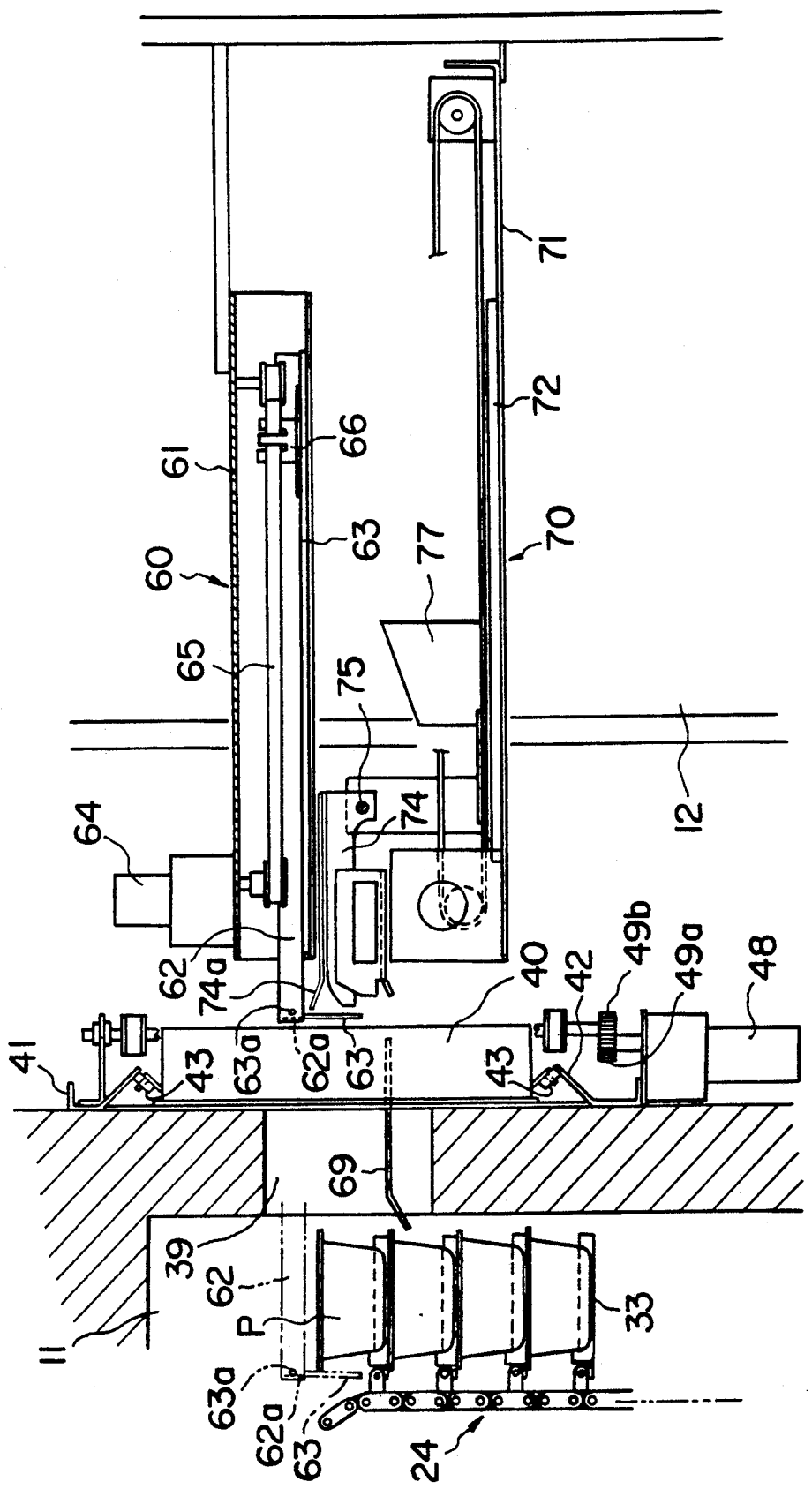
FIG. 10 is an enlarged front view of the conveying means and the feeding means.

Each of the doors 40 is slidable in the left or right direction on and along a pair of upper and lower guide rails, 42 fixed to a supporting plate 41, through the media of rollers 43, as illustrated in FIGS. 9 and 10. The two doors are so constructed that they usually come toward each other, as shown in FIG. 9, to shut the abovementioned transfer port 39, and that they come apart sidewise from each other when the transfer port is to be opened, thus constituting the so-called "sidewise sliding doors". A reference numeral 44 in FIG. 9 designates a pair of upper and lower endless belts which serve to open and close the doors 40. Each of the belts 44 is wound on and around a pair of upper and lower drive pulleys 45a provided on a vertical shaft 45 and a pair of driven pulleys 46. As seen from FIG. 9, the leftside door 40 is fixedly connected to the rear side of the belt 44 extending between the upper and lower pulleys 45a and 46 through engaging pieces 47 integrally provided on the upper and lower sides of this door; in the same manner, the rightside door 40 is fixedly connected to the front side of the belt 44 extending between the upper and lower pulleys 45a and 46 through engaging pieces 47 integrally provided on the upper and lower sides of this door. A reference numeral 48 in FIG. 9 designates a reversible motor to drive both belts 44. By causing this reversible motor 48 to move forward and backward, the belts 44 move forward and backward accordingly through the gears 49a, 49b, the vertical shaft 45, and the drive pulleys 45a, whereby the two doors 40 move in mutually approaching or separating directions to thereby open and close the abovementioned transfer port 39.

Figure 7:
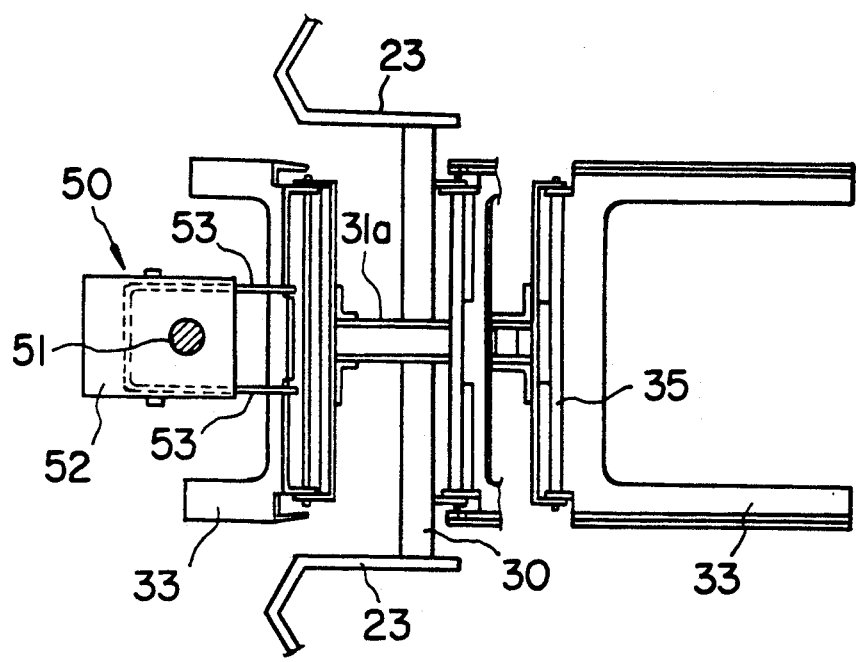
FIG. 7 is a plan view of a chain conveyor.
Figure 8:
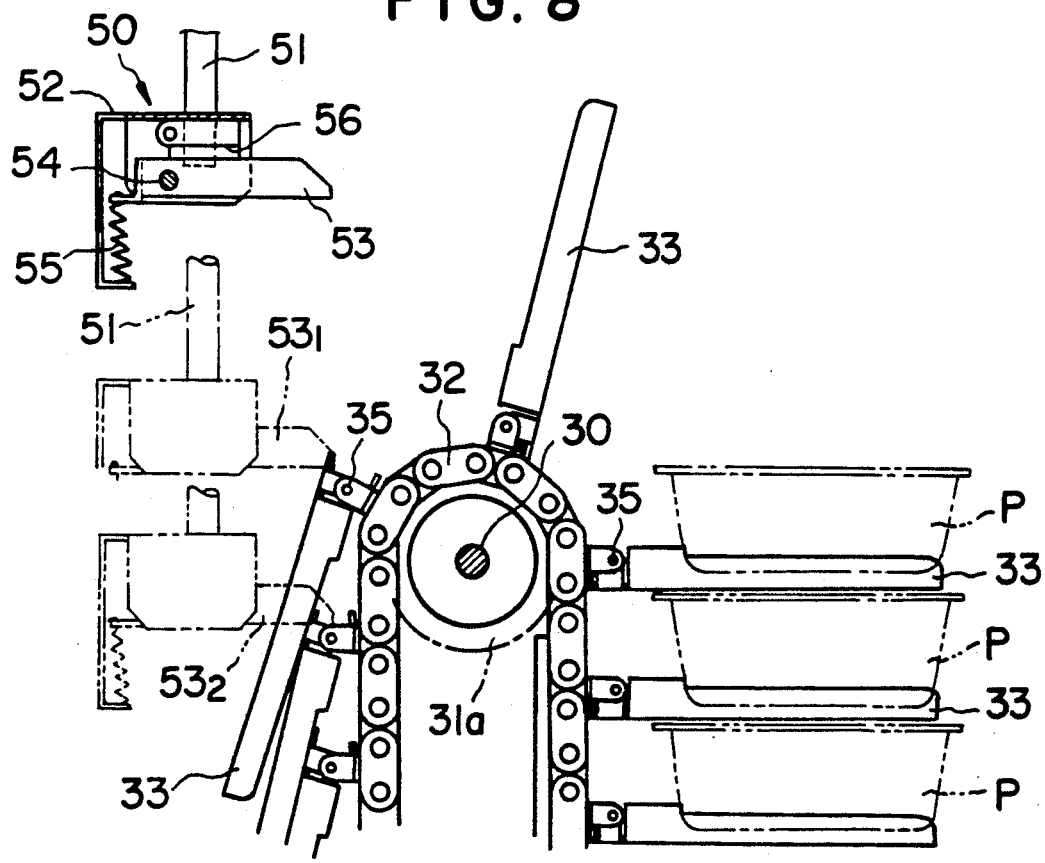
FIG. 8 is a fragmentary front view showing one part of the chain conveyor.

As seen from FIGS. 2, 7 and 8, above the chain conveyor 24 positioned to the side of the abovementioned frying chamber, there is provided forwarding means 50 which functions to raise the rack at the next lower position to the abovementioned transfer position, after the container P mounted on the topmost rack 33 has been conveyed.

The forwarding means 50, in the preferred embodiment of the present invention, is of such a construction that a vertical operating lever 51 which moves up and down is provided on the top part of the storage chamber 11 and inside the chain conveyor 24 positioned to the side of the frying chamber 12, and a pair of pushing rods 53, which function to push the abovementioned rack 33 downward, are rotatably mounted on a bracket 52, provided on the lower end of the operating lever 51, by means of a transverse shaft 54, as shown in FIG. 8.

The pushing rods, 53 are rotatably energized in the counterclockwise direction by a spring 55, and are usually held in abutment with a stopper 56, as shown in FIG. 8.

The abovementioned operating lever 51 is so constructed that it is connected, through a slot, to one end 57b of lever 57 oscillating up and down with its other end 57a as the pivotal point, and, by causing the lever 57 to oscillate in the up-and-down direction with an eccentric pin 59a on a rotatable disc 59 provided on the output shaft of the motor 58, the pushing rods 53 are oscillated up and down accordingly through this operating lever 51.

The pushing rods 53 are usually on the solid line position in FIG. 8. During operation, they move downward to come into abutment with the topmost rack 33 on the chain conveyor 24 facing the side of the frying chamber, as shown by a dot-and-dash line $53_1$, in FIG. 8; the rods further move downward to the position of a dot-and-dash line $53_2$ in FIG. 8 to push down the rack 33, thereby causing each rack 33 on the chain conveyor facing the opposite side from the frying chamber to go up to a height corresponding to the subsequent vertically adjacent rack 33. When the downward movement of the pushing rods 53 is terminated, they go upward again to return to the solid line position in FIG. 8. At this time, when the pushing rods 53 come into abutment with the rack 33 which has come around to the upper position, the pushing rods 53 rotationally retract in the clockwise direction against the abovementioned spring 55, as shown in FIG. 8, with the shaft 54 as the center of their rotation.

On the other hand, at the outside of the abovementioned transfer port 39, there are provided a conveying means 60 which functions to forward into the frying chamber the container P of the food materials for frying mounted on the topmost rack 33 of the chain conveyor situated to the side of the frying chamber; and a feeding means 70 which functions to receive and hold the container of the food materials for frying as sent out by the conveying means 60, open the lid of the container, and supply the materials for frying into the frying chamber 12.

The conveying means 60 in the illustrated embodiment is so constructed that, as shown in FIG. 10, a forwarding and retracting arm 62 is provided in a frame body 61 provided on the top part of the frying chamber 12, in a manner to be movable in the left and right direction, as viewed in FIG. 10, along the guide member 63, and then a container draw-out member 63 in a planar shape is oscillatably mounted on a transverse shaft 63a at the extreme end part of this forwarding and retracting arm 62 to the side of the storage chamber 11.

In FIG. 10, a reference numeral 64 designates a reversible motor to cause the forwarding and retracting arm 62 to perform its forwarding and retracting motion; a numeral 65 refers to a belt to be driven by the reversible motor, and a reference numeral 66 denotes a connecting member, by way of which the abovementioned forwarding and retracting arm 62 is fixedly joined to the belt 65. By rotating the motor 64 in the forward and reverse directions, the forwarding and retracting arm 62 is moved back and forth through the belt 65.

The abovementioned forwarding and retracting arm 62 is always at a solid line position in FIG. 10, and a container draw-out member 63 at its forward end hangs downward as shown. At the time of taking out the container of the food material to be fried, which is stored in the storage chamber 11, the motor 64 rotates in the forward direction to cause the forwarding and retracting arm 62 to move toward the storage chamber 11 and the container draw-out member 63 comes into contact with the container P of the food material for frying placed on the topmost rack 31, whereupon the container draw-out member 63 moves backward in the counter-clockwise direction in the drawing, and, as soon as it surpasses the container P, the member 63 hangs downward again. In the next place, the motor 64 rotates in the reverse direction to cause the container draw-out member 63 to retract in the right direction in the drawing, whereby it comes into contact with the side surface of the flanged part of the container P as shown by a double-dot-and-dash line in FIG. 10. At that time, the member 63 comes into contact with an end plate 62a of the forwarding and retracting arm 62, whereby its counter-clockwise rotation is inhibited. In this state, the forwarding and retracting arm 62 continuously retracts, whereby the container P is drawn out of the storage chamber 11. Incidentally, a reference numeral 69 in the drawing designates a guide plate for guiding the container P at the time of its drawing out. The guide plate 69 extends into the interior of the opening and closing door 40. A recessed part (not shown in the drawing) is formed in the door 40 for avoiding its interference with the guide plate 69.

Figure 11:
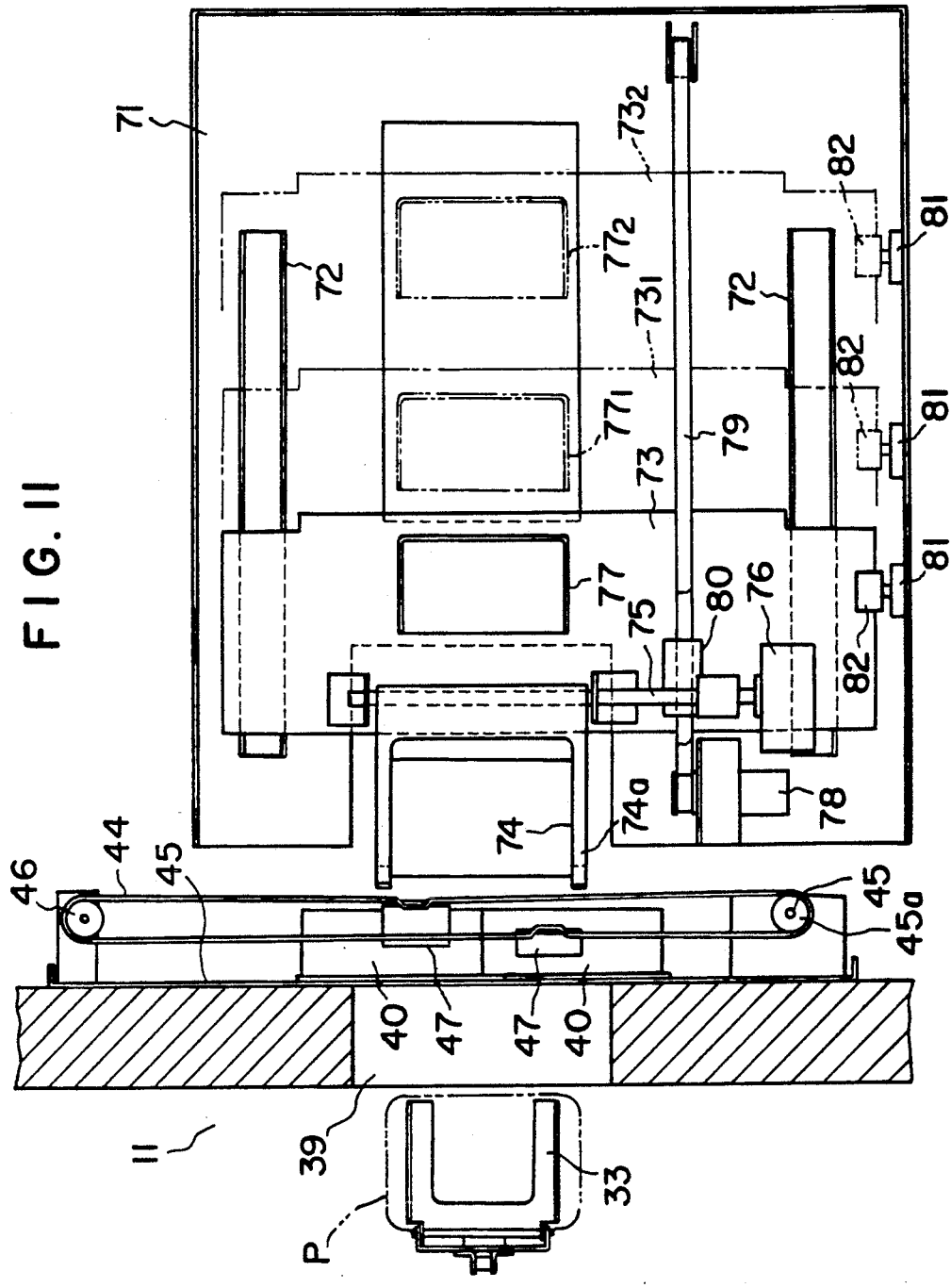
FIG. 11 is a plan view of the feeding means.

On the other hand, the abovementioned feeding means 70 is of such a construction that, as shown in FIGS. 10 and 11, a movable table 73 capable of moving in the left and right direction in the drawing along a pair of guide rails 72 is mounted on a supporting frame 71 mounted on the upper part of the frying chamber 12, and a holder 74 for receiving and holding the container P as transferred from the storage chamber 11 is provided on this movable table 73.

The holder 74 is in a substantially angled "U" shape, as viewed in plan, the base part of which is rotatably mounted on the movable table 73 by means of a shaft 75. A numeral 74a refers to a stopper piece provided on the upper surface of the holder 74, which functions to grip the flanged part P1 of the container P tightly between it and the upper surface of the holder 74. On the other hand, a reference numeral 74b denotes a supporting member for holding the bottom part of the container supported by the holder 74.

Figure 12:
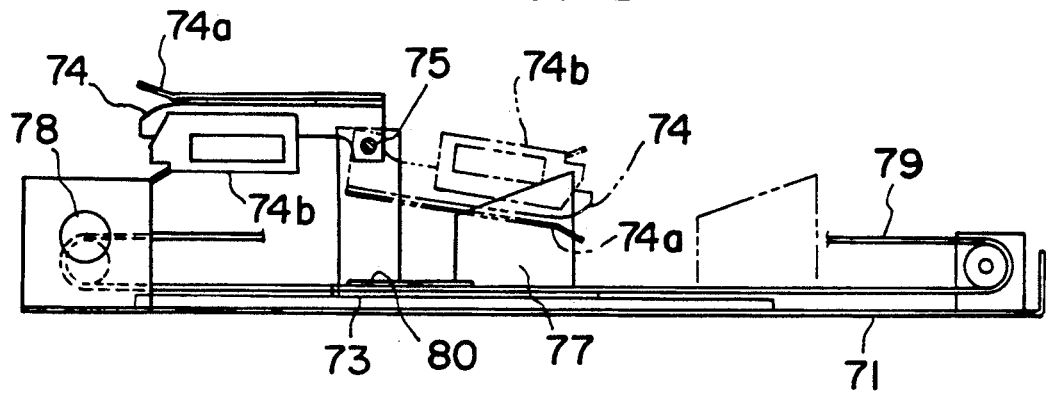
FIG. 12 is an explanatory diagram showing the state of operation of the feeding means.

The abovementioned holder 74 functions to invert the container P supported by the holder by turning it to a double-dot-and-dash line position in FIG. 12 by means of the reversible motor 76. A cutter 77 for cutting open the sealed lid P2 of the container P is provided on the abovementioned movable table 73 at a position corresponding to the container inverting position. As shown in FIG. 11, the cutter 77 is of such a construction that it takes an angled "U" shape, when viewed in plan, so that it can snip off the three sides of the lid P2 inward of the flanged part of the container main body P.

In FIG. 11, a reference numeral 78 designates a reversible motor for moving the abovementioned movable table 73, and numeral 79 refers to an endless belt to be driven by the motor 78, the movable table 73 being fixedly connected to the lower side of the belt 79 by means of a connecting member 79a.

The movable table 73 is usually on the solid line position in FIGS. 10 and 11, which is moved by the abovementioned motor 78 to cause the cutter 77 on it to be positioned above a frying basket 80 for frying work installed within the frying chmaber 12, as soon as the container P of the food material to be fried as drawn out of the storage chamber 11 is transferred onto the abovementioned holder 74. A pair of baskets 80, in the preferred embodiment as shown in FIG. 2, is provided side by side; and the abovementioned cutter 77 is selectively moved to the double-dot-and-dash line positions $77_1$ and $77_2$ in FIG. 11, in correspondence with each basket 80. For detecting each of the abovementioned positions of the cutter 77, there are provided three detecting switches 81 on the abovementioned supporting frame 71, and a single operating member 82 to the switch 81 on the movable table 73.

Upon movement of the abovementioned cutter 77 to the abovementioned position $77_1$ or $77_2$, the holder 74 is inverted as sown by the double-dot-and-dash line in FIG. 12 by means of the motor 76 to cut-open the sealed coverlid P2 of the container P by means of the cutter 77, whereby the food material to be fried is dropped into the frying basket.

Each of the pair of abovementioned frying baskets 80 is formed of perforated plate, and the like; and is provided in pair in the interior at a respective one of the pair of fried food take-out ports 10L and 10R. Also, each of the frying baskets 80 is fitted independently and rotatably on a shaft 85 provided at the edge of a cooking vessel 84, so that it can be freely dipped into, or pulled out of, the cooking vessel 84 filled with cooking oil.

Beneath the cooking vessel 84, there is provided a cooking oil feeding tank 86, from which the cooking oil is periodically fed in circulation into the cooking vessel through feeding tubes 86a and 84a by means of a circulating pump 84 (not shown in the drawing), and the oil in the cooking vessel 86 is maintained at a constant temperature (e.g., about 180° C.) by means of a temperature sensor 87 provided, in full extension, at the bottom of the cooking vessel. A reference numeral 88 designates an oil discharging tank, a numeral 88a refers to an oil discharging port with a control valve, a reference numeral 89 denotes a fresh oil tank to replenish fresh cooking oil by means of a feeding pump 89a into the oil feeding tank 86 through a feeding tube 89b.

A cartridge 90 containing therein a multitude of cups C is provided on the front upper part of each basket 80. The cup C containing the fried food is placed, one by one, on a cup placement table 91 provided inside each of the abovementioned fried food take-out ports 10L and 10R.

Figure 3:
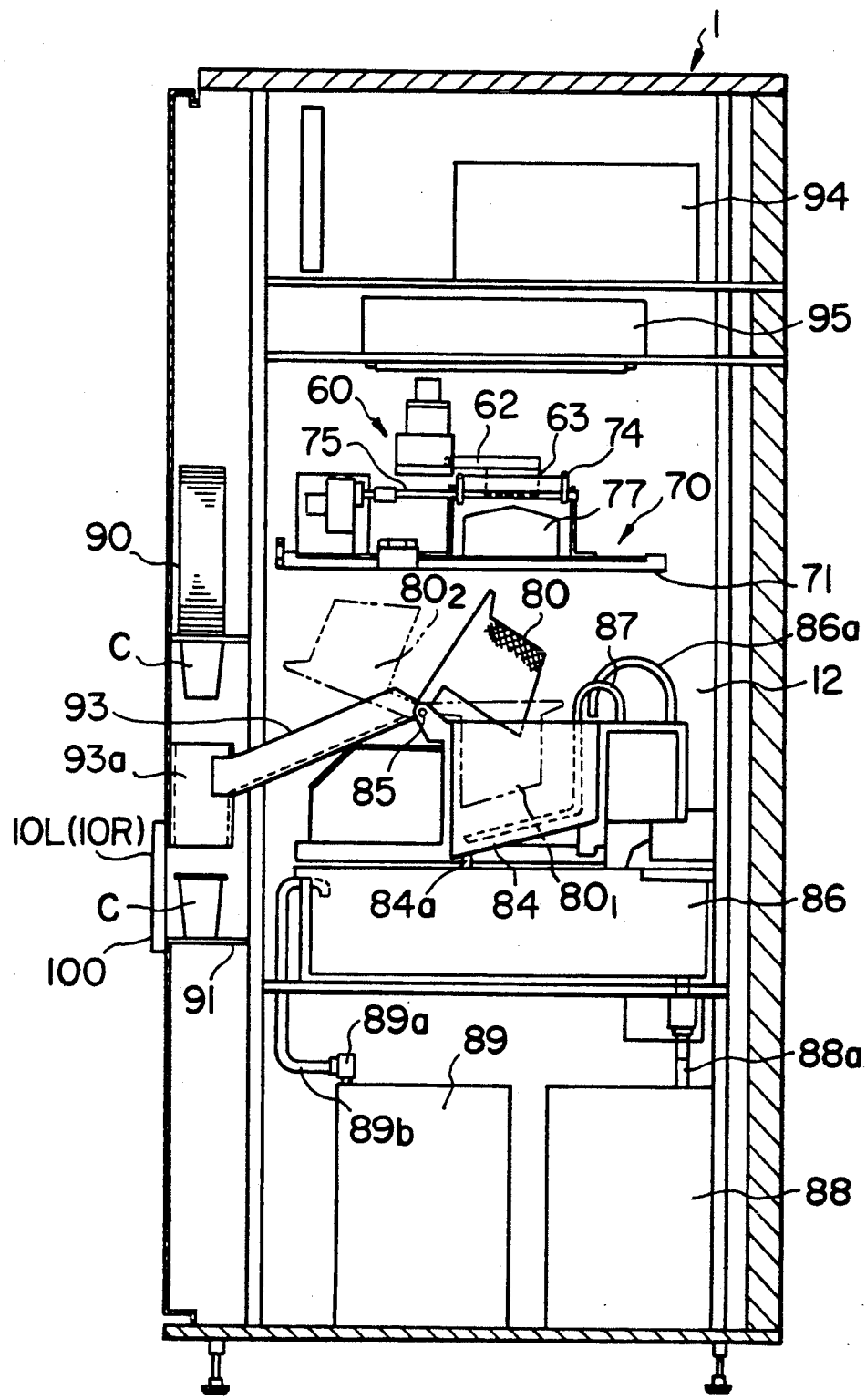
FIG. 3 is a side elevational view, partly in longitudinal cross-section, of the automatic food frying and vending system shown in FIG. 1.

Each of the abovementioned baskets 80 is rotationally driven independently of the other, as shown by the solid line and the double-dot-and-dash line in FIG. 3, by means of a driving mechanism (not shown in the drawing) with the abovementioned shaft 85 as the center of rotation. The basket is ordinarily in its stand-by position shown by the solid line in the drawing. When the food material for frying is to be supplied, either one of the baskets 80, as chosen, moves to the double-dot-and-dash line position $80_1$ in FIG. 3 so as to receive therein the frying material from the container P. After it has stayed in the cooking vessel 84 for a predetermined period of time for frying the food material, as supplied, it is brought upward to the solid line position to drain the oil, followed by its further turning to a position $80_2$ in the double-dot-and-dash line in FIG. 3 to pass the fried food into a chute 93 and a cylindrical duct 93a integral with the chute, through which the fried food is delivered into the cup C.

In FIGS. 2 and 3, a reference numeral 94 designates an air outlet fan, a numeral 95 refers to a deodorant filter, and a reference numeral 96 designates an automatic control device.

The automatic food frying and vending system as above-described operates in the following manner. When a purchaser of the fried food deposits a coin or a bank note, in a required amount, into the slot 6 or 7 in FIG. 1, and pushes either one of the fried food selection buttons 4a through 4f, the stocker 20 in the storage chamber 11 rotates and any one of the chain conveyors 24 accommodating the containers P of the food material to be fried arrives at the position facing the frying chamber 12 and stops there, as shown in FIGS. 3 and 4.

Next, as soon as the opening and closing lid 40 of the conveying port 39 is opened, the forwarding and retracting arm 42 of the conveying means 60 advances into the storage chamber 11, whereby the topmost container P on the chain conveyor 24 is taken out by the container draw-out member 63 from the take-out port 39 on and through guide plate 69, and transferred onto the holder 74 of the feeding means 70. Then, the take-out port 39 is closed by the opening and closing door 40, and, at the same time, the operating lever 51 of the forwarding means 50 lowers, whereby the topmost rack 33 at the inside of the chain conveyor is pushed downward by the pushing member 53 and the container P of the next level on the chain conveyor facing the outside is brought to the topmost position with the consequence that the operating lever 51 returns upwardly to its initial position.

Subsequently, the holder 74, onto which the container P has been transferred, moves to the side of the frying chamber along with the movable table 73, while the cutter 77 on the movable table 73 moves to, and stops at, an upper position of either one of the pair of the frying baskets 80. Then, the holder 74 is inverted as shown by the double-dot-and-dash line in FIG. 12 to cut-open the sealed lid of the container held on the holder 74, whereby the food material to be fried in the container is dropped into the basket 80 which has moved into the cooking vessel 84, ready for cooking the material. As soon as the food material to be fried in the container has all dropped into the cooking vessel 84, the holder 74 returns to the solid line position in FIG. 12, and the movable table 73 returns to the solid line position in FIGS. 2 and 11, in which state the free end side of the holder 74 rotates downward to cause the used empty container P to drop by its own weight, which is collected into an empty container recovering vessel 83.

Simultaneously, the food material to be fried, as fed into the basket 80, is fried with cooking oil in the cooking vessel 86. The fried food, after draining the oil from it as mentioned above, is delivered into the cup C, and the basket 80 returns to the solid line position in FIG. 3 In readiness for the next frying task.

The abovementioned series of operations, as well as temperature for holding the fried food, heating temperature of the cooking oil, and so on are all controlled automatically by the abovementioned automatic control section 96, the operating conditions of which are indicated sequentially on the display section 5 provided on the front panel of the automatic food frying and vending apparatus.

Upon completion of frying, the purchaser opens the door 100 of either of the fried food take-out ports 10L and 10R, thereby being able to take out the cup C containing the fried food on the cup placement table 91.

The cup placement table 91 should preferably be constructed in a manner to be movable up and down, depending on necessity, in association with the opening and closing operation of the abovementioned door 100. One example of such construction is shown in FIGS. 13 and 14.

Figure 13:
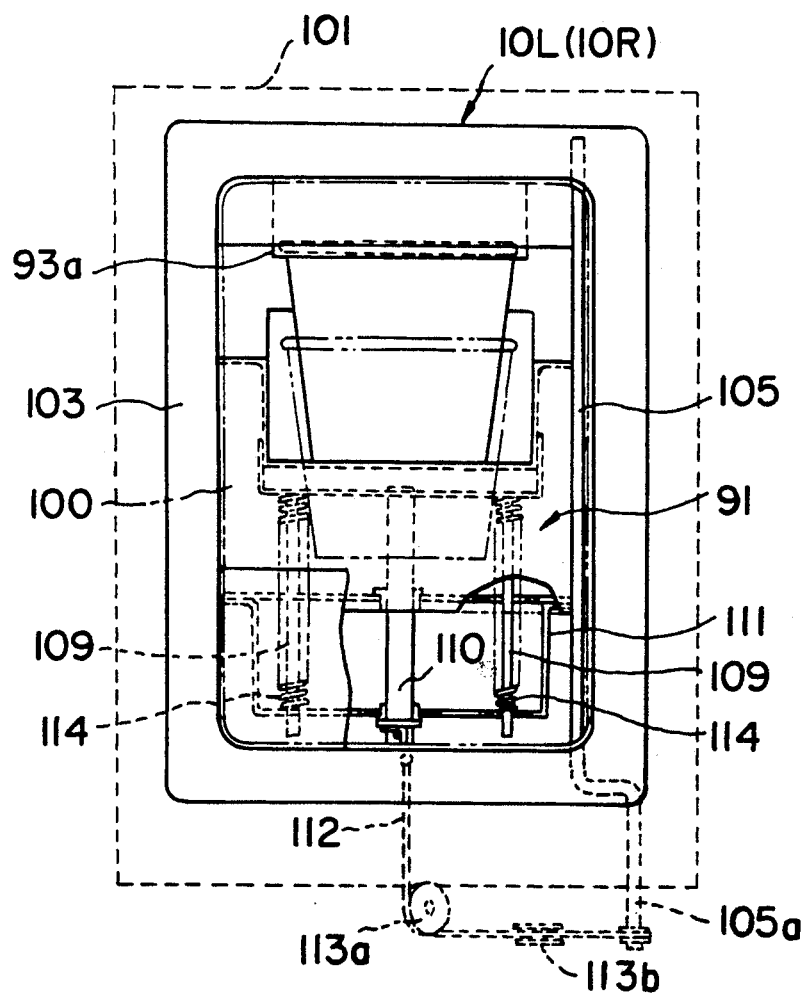
FIG. 13 is a front view of the fried food take-out port.
Figure 14:
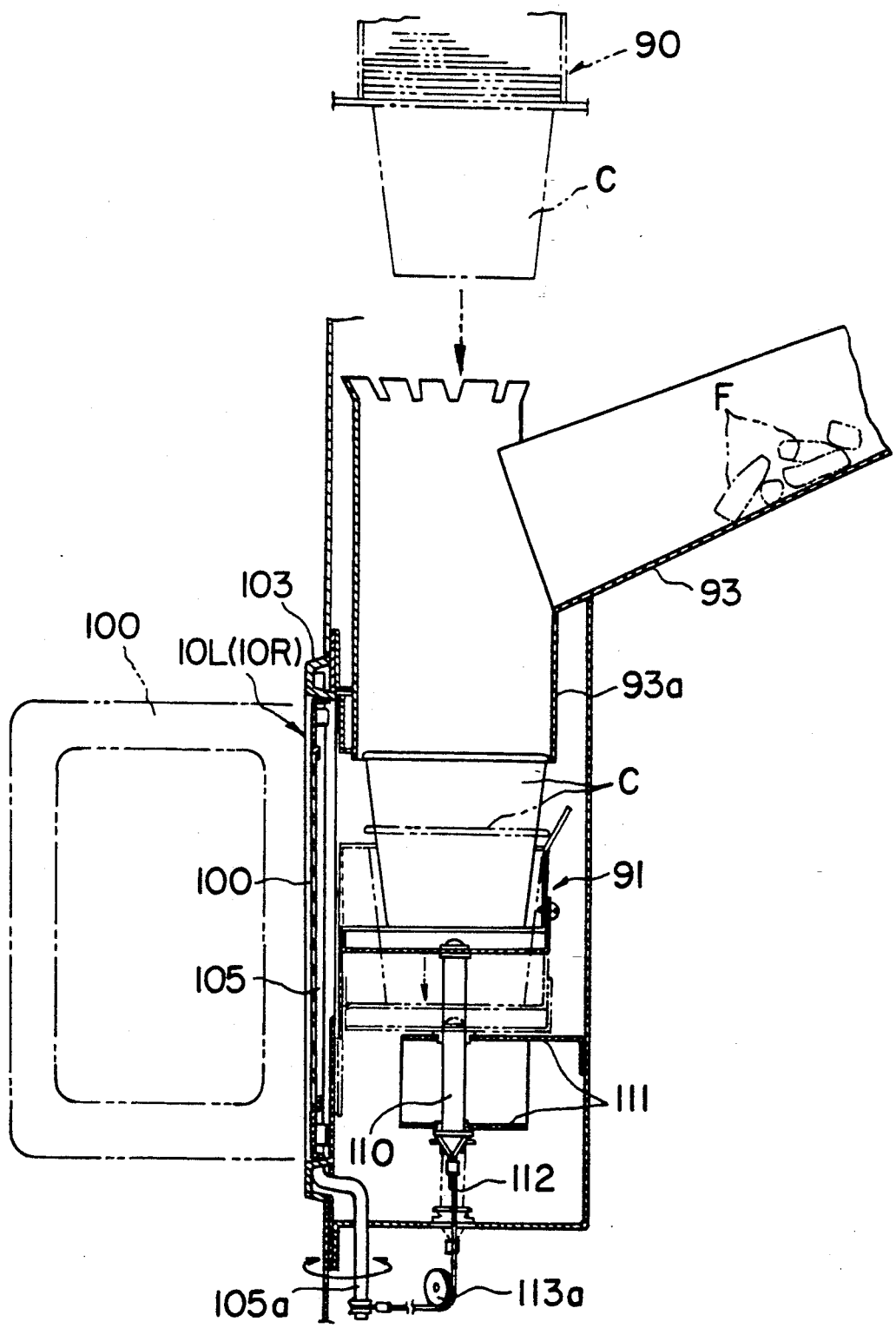
FIG. 14 is a side elevational view, in longitudinal cross-section, showing the fried food take-out port of FIG. 13.

In FIGS. 13 and 14, a reference numeral 101 designates one of the outer casing walls, in which the abovementioned cup take-out ports 10L and 10R are formed, and the abovementioned door 100 is hinged on a shaft 105 provided on the edge of an opening frame 103 so as to be able to open and close the opening defined by the opening frame. The shaft 105 is integrally fixed on one side of the door 100, the lower end part 105a of which is bent in the form of a crank.

The cup placement table 91 provided inside the cup take-out ports 10L and 10R is supportively mounted on a supporting member 111, in a manner to be movable up and down, by means of a pair of guide rods 109 and a forwarding and retracting lever 110 between the guide rods, both being integrally joined to the cup placement table 91. The guide rods are usually energized in the upward direction by means of a compression spring 114. A numeral 112 refers to a wire to cause the cup placement table 91 to move up and down in association with the opening and closing operation of the door 100. One end of the wire 112 is connected to the lower end 105a of the abovementioned shaft 105, while the other end thereof is connected to the lower end of the forwarding and retracting lever 110. Reference numerals 113a and 113b denote guide pulleys for the wire 112.

In the above-described construction, the door 100 is usually closed and the cup placement table 91 is in its position moved upwardly by the compression spring 114 as shown by the solid line in FIG. 14. In this state, when one cup C is fed from the abovementioned cartridge 90, the cup C passes through the cylindrical duct 93a to be placed on the cup placement table 91 as shown by the solid line in FIG. 14.

Consequently, when the fried food F is fed into the cup C by way of the chute 93, it can be securely received in the cup C without its falling outside the cup, because periphery of the open top of the cup is covered with the cylindrical duct 93a.

Upon reception of the fried food F into the cup C, the purchaser opens the door 100 of the cup take-out port 10L or 10R, when the shaft 105 integral with the door rotates; and the lower end part 5a of the shaft in the form of crank a rotates accordingly, whereby the wire 112 is pulled toward the shaft by way of the guide rollers 113a, 113b and the forwarding and retracting lever 110 comes downward. Then, the cup placement table 91 moves downward to the position shown by the double-dot-and-dash line in FIG. 14, and the cup C on the cup placement table 91 moves lower than the abovementioned cylindrical duct 93a, thereby enabling the cup C to be taken out easily.

In the above-described embodiment, use is made of the wire as the expedient for the downward movement of the cup placement table 91 in association with the opening operation of the door 100. It should, however, be noted that the means for moving the cup placement table is not limited to the wire alone, but the equipment can be constructed in such a manner that it is associated with, for example, cams, gears, and so on.

Though not shown in the drawing, there is disposed a fire extinguisher in the vicinity of the cooking vessel 84, which becomes automatically operative when the temperature in the apparatus over and above the cooking vessel reaches a predetermined temperature (e.g., 95° C. or higher).

As has so far been described in the foregoing, the automatic food frying and vending apparatus according to the present invention is so constructed that the containers of the food material for frying, stored in the refrigerated storage chamber 11, are drawn out, one by one, by the conveying means, then transferred to and held by the holder 74 on the movable table 73 which moves in the substantially horizontal direction. Subsequently the holder 74 is inverted to cut-open the sealed lid P2 of the container P by the cutter 77 provided on this movable table, when positioned above the basket 80 for frying in the frying chamber 12, and drops the food material for frying from the container directly into the basket 80. Therefore, the food material to be fried can be simply and securely fed into the frying chamber from the storage chamber, whereby the automatic food frying and vending apparatus which is simple in construction and capable of easy maintenance can be provided.

Further, as mentioned above, the cup placement table 91 provided inside the fried food take-out port 10L (or 10R) is constructed in a manner to be movable up and down, and a cylindrical duct 93a is provided to cover the periphery of the open top of the cup C placed on the cup placement table 91, thereby causing the top of the cup C to be positioned within the abovementioned cylindrical duct at the time of feeding the fried food into the cup. Thus, fried food can be introduced into the cup without failure. Moreover, at the time of taking out the cup filled with the fried food, when the cup placement table 91 is moved downward in association with the opening operation of the door 100 of the fried food take-out port 10L (or 10R) so as to bring the cup C on the table 91 lower than the abovementioned cylindrical duct 93a, the cup C can be taken out easily without the cylindrical body 93a obstructing to the take-out operation.

Although, in the foregoing, the present invention has been described in specific details with reference to a preferred embodiment therof, the invention is not limited to this embodiment alone, but any changes and modifications may be made within the ambit of the present invention as recited in the appended claims.

I claim:

1. An automatic food frying and vending system, comprising:
    a housing which includes a refrigerated storage chamber for preserving food material and a frying chamber for cooking said food material;
    stocker units disposed in said storage chamber for receiving and holding said refrigerated food material in a plurality of sealed containers;
    a cooking vessel having a top opening disposed in said frying chamber for frying food contained therein;
    conveying means for selectively removing said sealed containers one at a time from said stocker units; and
    feeding means for receiving said sealed container from said conveying means, said feeding means including means for inverting the received sealed container over the cooking vessel and including means for opening said inverted sealed container to drop the food material by its own weight into the cooking vessel.

2. The automatic food frying and vending system of claim 1 wherein the feeding means includes a table member movable in opposite directions into and out of registry with the cooking vessel, said inverting means includes a rotatable holder mounted on and movable with the table member; and said opening means is a cutting member mounted on and movable with the table member for cutting the sealed lid of the inverted food container.

3. The automatic food frying and vending system of claim 2 including means for moving the table member over the cooking vessel while the holder supports the container in a non-inverted position, and the cutter being operative to cut the sealed lid of the container during inversion of the container.

4. The automatic food frying and vending system of claim 1 wherein said conveying means comprises an arm movable substantially horizontal in one direction toward the storage chamber and in an opposite direction toward the frying chamber, and a drawing member mounted to engage and withdraw from a stocker unit a sealed food container during movement in said opposite direction.

5. The automatic food frying and vending system of claim 1 wherein the housing includes a take-out port for removing food from the system;
    a placement table disposed in the housing adjacent the take-out port for supporting a cup;
    cup feeding means for placing a cup on the placement table;
    a cylindrical duct member disposed in the housing having a lower open end for alignment with the placement table and an upper open end for introducing fried food into the duct member;
    means for positioning a cup disposed on the placement table in overlapping relationship with the lower end of the duct during introduction of fried food into the upper end of the duct;
    means for transferring food from the cooking vessel to the upper end of the duct; and
    means for positioning the cup in a position spaced from the lower end of the duct to remove the fried food from the take-out port.

6. The automatic food frying and vending machine of claim 5 wherein the cup positioning means includes means for moving the placement table in substantially a vertical direction to position a cup into and out of overlapping relationship with the lower end of the duct.

7. The automatic food frying and vending system of claim 5 wherein the lower open end of the duct member has a diameter for surrounding the open top of the cup while in overlapping relationship.

8. The automatic food frying and vending machine of claim 5 wherein the cup positioning means includes means for moving the placement table in substantially a vertical direction to position a cup into and out of overlapping relationship with the lower end of the duct.

9. The automatic food frying and vending system of claim 5 wherein the lower open end of the duct member has a diameter for surrounding the open top of the cup while in overlapping relationship.

10. An automatic food frying and vending system, comprising:
    a housing which includes as refrigerated storage chamber and a frying chamber, said housing including a take-out port for removing food from the system;

a cooking vessel disposed in the frying chamber for frying food material transported from the storage chamber;

a placement table disposed in the housing adjacent the take-out port for supporting a cup having an open top;

cup feeding means for placing a cup on the placement table;

a cylindrical duct member disposed in the housing having a lower open end for alignment with the placement table and an upper open end for receiving fried food;

means for positioning a cup disposed on the placement table in overlapping relationship with the lower end of the duct prior to the receiving of fried food into the upper end of the duct;

means for transferring fried food from the cooking vessel to the upper end of the duct; and means for positioning the cup after transferring the fried food, to a position spaced from the lower end of the duct to remove the cup from the take-out port.

* * * * *